United States Patent
Moon

(10) Patent No.: US 12,395,895 B2
(45) Date of Patent: Aug. 19, 2025

(54) METHOD AND APPARATUS FOR SERVICE OF ULTRA-RELIABLE AND LOW-LATENCY COMMUNICATION IN A MOBILE COMMUNICATION SYSTEM

(71) Applicant: Samsung Electronics Co., Ltd., Suwon-si (KR)

(72) Inventor: Sangjun Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 325 days.

(21) Appl. No.: 18/159,946

(22) Filed: Jan. 26, 2023

(65) Prior Publication Data

US 2023/0239741 A1   Jul. 27, 2023

(30) Foreign Application Priority Data

Jan. 27, 2022   (KR) .................. 10-2022-0012449

(51) Int. Cl.
| | |
|---|---|
| *H04W 28/18* | (2009.01) |
| *H04W 28/02* | (2009.01) |
| *H04W 28/08* | (2023.01) |

(52) U.S. Cl.
CPC ....... *H04W 28/18* (2013.01); *H04W 28/0226* (2013.01); *H04W 28/0925* (2020.05)

(58) Field of Classification Search
CPC ....... H04L 47/18; H04L 47/20; H04L 47/283; H04W 28/18; H04W 28/0226;
(Continued)

(56) References Cited

U.S. PATENT DOCUMENTS

| | | |
|---|---|---|
| 2018/0279409 A1 | 9/2018 | Balasubramanian et al. |
| 2019/0280834 A1 | 9/2019 | Joseph et al. |

(Continued)

FOREIGN PATENT DOCUMENTS

| | | |
|---|---|---|
| WO | 2020/057490 A1 | 3/2020 |
| WO | 2021/187913 A1 | 9/2021 |

OTHER PUBLICATIONS

Nokia et al.; New SID on Study on 5G Timing Resiliency and TSC enhancements; TSG SA Meeting #SP-94E; SP-211634; Dec. 14-20, 2021; Electronic meeting.

(Continued)

*Primary Examiner* — Khoa Huynh
(74) *Attorney, Agent, or Firm* — Jefferson IP Law, LLP

(57) ABSTRACT

Disclosed is a fifth generation (5G) or sixth generation (6G) communication system for supporting higher data transmission rate. A method for providing an ultra-reliable and low-latency communication (URLLC) service in an ultra-reliable and low-latency communication function (URLLCF) of a mobile communication system is provided. The method includes receiving an end-to-end latency request message from an application function (AF) device, the latency request message including a latency requirement and at least one of generic public subscription identifier (GPSI) information of a specific user equipment (UE), data network name (DNN), or single-network slice selection assistance (S-NSSAI), performing a subscription procedure of URLLC service condition with a unified data management (UDM)/user data repository (UDR) device, obtaining location information of the UE, identifying whether the location information conforms to a range required by the URLLC service, configuring a policy and association satisfying a latency for the URLLC service to the UE, and (Continued)

providing a URLLC service notification to the AF based on the configuration.

15 Claims, 7 Drawing Sheets

(58) Field of Classification Search
CPC ......... H04W 28/0925; H04W 28/0268; H04W 28/24; H04W 28/0236; H04W 60/00
See application file for complete search history.

(56) References Cited

U.S. PATENT DOCUMENTS

| | | | |
|---|---|---|---|
| 2020/0068653 A1* | 2/2020 | Li | H04L 12/14 |
| 2020/0112907 A1* | 4/2020 | Dao | H04M 15/8016 |
| 2020/0128503 A1 | 4/2020 | Li et al. | |
| 2020/0214054 A1 | 7/2020 | Qiao et al. | |
| 2021/0329535 A1* | 10/2021 | Chou | H04L 1/0009 |

OTHER PUBLICATIONS

3GPP; 3rd Generation Partnership Project; Technical Specification Group Services and System Aspects; Service requirements for the 5G system; Stage 1 (Release 18); 3GPP TS 22.261; V18.5.0; Dec. 2021; Valbonne, France.

Huawei; Add E2E latency analysis use case and requirements; 3GPP TSG SA WG5 Meeting 140-e; S5-216480; Electronic meeting, online; Nov. 15-24, 2021.

International Search Report with Written Opinion dated Apr. 10, 2023; International Appln. No. PCT/KR2023/001229.

European Search Report dated Apr. 1, 2025, issued in European Application No. 23747363.2.

* cited by examiner

METHOD AND APPARATUS FOR SERVICE OF ULTRA-RELIABLE AND LOW-LATENCY COMMUNICATION IN A MOBILE COMMUNICATION SYSTEM

CROSS-REFERENCE TO RELATED APPLICATION(S)

This application is based on and claims priority under 35 U.S.C. § 119(a) of a Korean patent application number 10-2022-0012449, filed on Jan. 27, 2022, in the Korean Intellectual Property Office, the disclosure of which is incorporated by reference herein in its entirety.

BACKGROUND

1. Field

The disclosure relates to an apparatus and method for providing a data service in a wireless communication system. More particularly, the disclosure relates to a method and apparatus for providing ultra-reliable and low-latency communication (URLLC) in third generation partnership project (3GPP) fifth generation (5G) System (5GS).

2. Description of Related Art

Fifth generation (5G) mobile communication technologies define broad frequency bands such that high transmission rates and new services are possible, and can be implemented not only in "Sub 6 gigahertz (GHz)" bands, such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra-reliable low latency communications (URLLC), and massive machine-type communications (mMTC), there has been ongoing standardization regarding beamforming and massive multiple input-multiple output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies, such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service-based architecture or service-based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies, such as full dimensional MIMO (FD-MIMO), array antennas and large-scale antennas, meta-material-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, as aspect of the disclosure is to provide a method and apparatus for providing an ultra-reliable and low-latency communication (URLLC) service in a 3 GPP system (5GS).

Another aspect of the disclosure is to provide a method for providing a redundant transmission function in order to increase reliability during an URLLC service.

Another aspect of the disclosure is to provide a configuration and interoperating method of a transport network for securing low-latency when a 5GS provides the low-latency and a control apparatus therefor.

Another aspect of the disclosure is to provide a method for downlink stream scheduling in a mobile communication system and a control apparatus therefor.

Additional aspects will be set forth in part in the description which follows and, in part, will be apparent from the description, or may be learned by practice of the presented embodiments.

In accordance with an aspect of the disclosure, a method for providing a URLLC service in an ultra-reliable and low-latency communication function (URLLCF) of a mobile communication system is provided. The method includes receiving an end-to-end latency request message from an application function (AF) device, the end-to-end latency request message including a latency requirement and at least one of generic public subscription identifier (GPSI) information of a specific user equipment (UE), data network name (DNN), or single-network slice selection assistance information (S-NSSAI), performing a subscription procedure of URLLC service condition with a unified data management (UDM)/user data repository (UDR) device, obtaining location information of the UE, identifying whether the location information conforms to a range required by the URLLC service, configuring a policy and association satisfying a latency for the URLLC service to the UE, and providing a URLLC service notification to the AF based on the configuration.

In accordance with another aspect of the disclosure, a method for providing an URLLC service in a URLLCF of a mobile communication system is provided. The method includes receiving a packet error rate (PER) request message from a AF device, the PER request message including PER information and at least one of GPSI information of a specific UE, DNN, or S-NSSAI, performing a subscription procedure of URLLC service condition with a UDM/UDR device, obtaining location information of the UE, identifying whether the location information conforms to a range required by the URLLC service, configuring a policy and association satisfying a latency for the URLLC service to the UE, and providing a URLLC service notification to the AF based on the configuration.

In accordance with another aspect of the disclosure, a method for providing a URLLC service in a URLLCF of a mobile communication system is provided. The method includes receiving an end-to-end latency request message from an AF device, the end-to-end latency request message including latency requirement, quality of service (QoS) monitoring information, and at least one of GPSI information of a specific UE, DNN, or S-NSSAI, performing a subscription procedure of URLLC service condition with a UDM/UDR device, obtaining location information of the UE, identifying whether the location information conforms to a range required by the URLLC service, configuring a policy and association satisfying a latency for the URLLC service to the UE, and providing a URLLC service notification for adjusting a downlink scheduling to the AF based on the configuration.

According to the disclosure, when a 5GS provides an URLLC service, it is possible to configure which session of which terminal to provide redundancy transmission. In addition, the 5GS can provide low-latency in conjunction with transport network configurations. Further, when the 5GS provides low-latency, downlink stream scheduling of an application can be controlled according to the feedback of a radio access network (RAN).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. In a case that used for an application such as Smart Grid, accurate time synchronization between terminals is required. In this case, a 5G system (5GS) may provide time synchronization between terminals.

Figure 1:
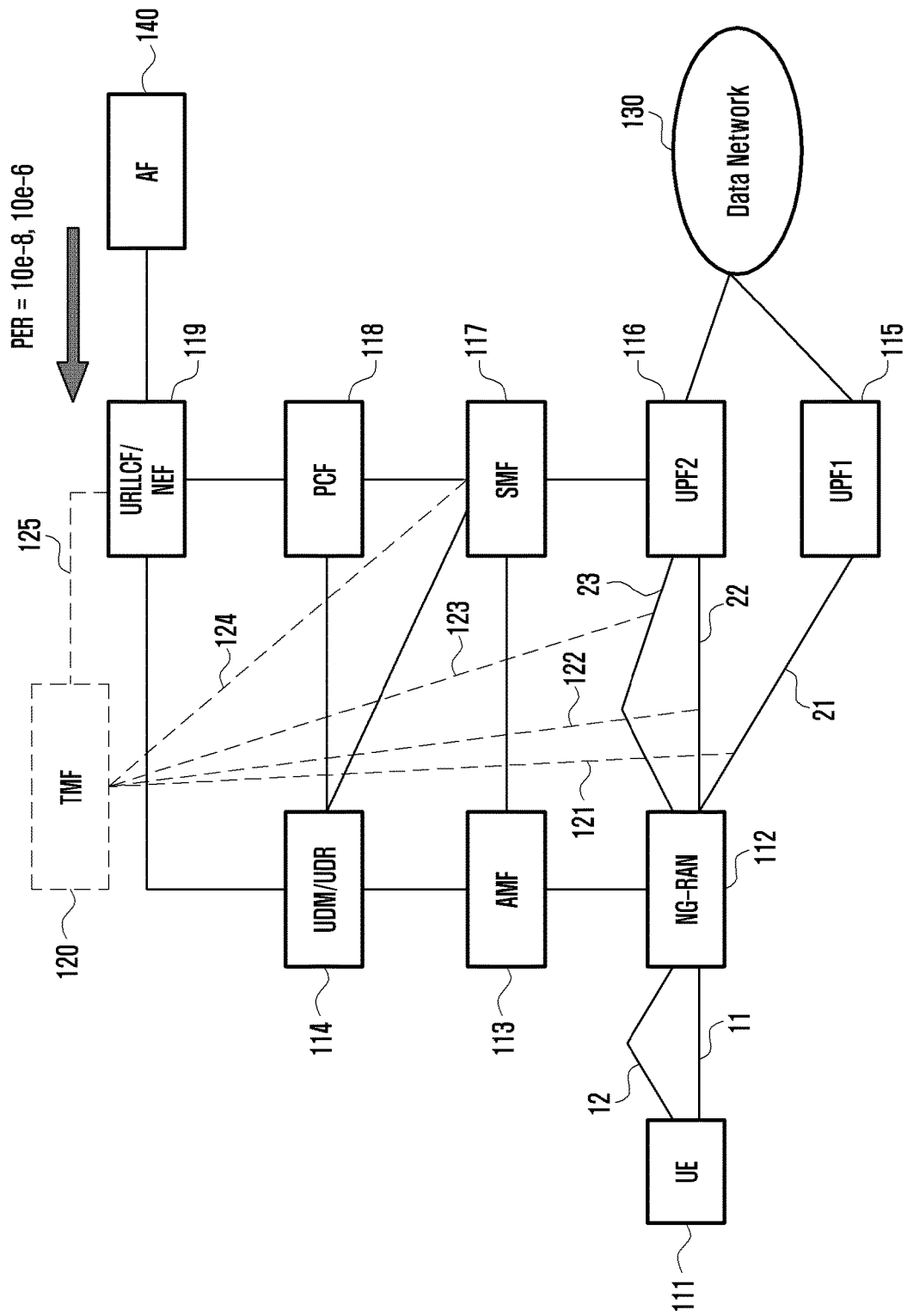
FIG. 1 is a diagram illustrating a case in which an application function (AF) explicitly provides a packet error rate (PER) to a 5GS for an URLLC service when the 5GS provides the URLLC service according to an embodiment of the disclosure.

FIG. 1 is a diagram illustrating a case in which an application function (AF) explicitly provides a packet error rate (PER) to a 5GS for an URLLC service when the 5GS provides the URLLC service according to an embodiment of the disclosure.

Referring to FIG. 1, a user equipment (UE) 111, a radio access network (RAN) 112, an access and mobility management function (AMF) device 113, an unified data management (UDM)/user data repository (UDR) device 114, user plane function (UPF) devices 115 and 116, a session management function (SMF) device 117, a policy control function (PCF) device 118, an ultra-reliable and low-latency communications function (URLLCF)/network exposure function (NEF) device 119, a transport management function (TMF) device 120, an application function (AF) device 140, and a data network (DN) 130 are illustrated.

Each NF device illustrated in FIG. 1 may be embodied in a single server, the function of a single NF device may be implemented in two or more servers, or two or more NF devices may be embodied in a single server. In the following description, for convenience of description of each NF device, the expression "device" will be omitted such as AMF 113, UPF1 115, UPF2 116, and SMF 117, and a description will be made. However, it should be noted that all AFs may be run within at least one server as described above.

In addition, NF devices may include a plurality of NF devices that perform the same function. FIG. 1 exemplarily illustrates different UPFs 115 and 116 as such an example. Although two different UPFs 115 and 116 are illustrated in FIG. 1, three or more UPFs may exist on the same network. Similarly, two or more devices such as the SMF 117, the AMF 113, and the PCF 118 may also exist. It should be noted that in FIG. 1, only representative NFs are briefly illustrated to reduce the complexity of the drawing.

In addition, two or more NF devices that perform the same function may be embodied in a single server, or may be embodied in different servers. The case in which NF devices are embodied in a single server may be, for example, the case of providing services corresponding to different PDU sessions to a single UE or different UEs in the same area. In addition, the case in which NF devices are embodied in different servers may correspond to the case in which the NF devices are located in different areas. In this way, each structure of NFs may be installed in plurality based on various factors such as area and/or services provided and/or bearers to be managed.

In addition, a single NF and/or two or more NFs may be embodied as a single network slice. A network slice may be provided in the form in which a single NF and/or two or more NFs operate as a single virtual network and provide the same service to a predetermined user and/or user group.

The function and operation supported by each of the NFs illustrated in FIG. 1 will be briefly described.

The UE 111 may be a user equipment, and may be call differently depending on a radio access technology, for example, a terminal, an access terminal a mobile terminal, a mobile device or mobile equipment, a mobile note, and the like. As a representative device of the UE 111, there may various forms of devices such as a smartphone, a portable phone, a mobile terminal, a smart watch, a tablet computer, a notebook computer, a personal computer, a vehicle equipped with a radio access function, and the like. In addition, it may be an IoT device and/or various devices equipped with an IoT function. The UE 111 may be various forms that are capable of receiving services according to the disclosure described below.

The NG-RAN 112 may be a base station that is in charge of performing transmission and reception of data/signal/ message with the UE 111 via radio access technology in a mobile communication network. For example, data provided from the DN 130 to the UE 111 via the UPF 115 and/or 116 may be provided to the UE 111 using a mobile communication access technology, and data transmitted from the UE 111 using the mobile communication access technology may be transmitted to the DN 130 via the UPF 115 and/or 116.

The AMF 113 may provide an access and mobility management function in units of UEs, and a single SMF may be basically accessed by single UE.

The UDM/UDR 114 may store user subscription data, policy data, and the like.

The UPF 115, 116 may transfer a downlink PDU received from the DN 130 to the UE 111 via the RAN 112 in the downlink, and may transfer an uplink PDU received from the UE 111 via the RAN 112 to the DN 130. That is, the UPFs 115 and 116 provide a path for data transmission and reception in a user plane, and may perform control therefor.

The SMF 117 may provide a session management function for the UE 111, and in the case in which the UE 111 has a plurality of sessions, each session may be managed by each different SMF.

The PCF 118 may receive information associated with a packet flow from an application server (AS) or a predetermined application function (AF), and may provide a function of determining a policy associated with mobility management, session management, and the like. Particularly, the PCF 118 may support a function of supporting a unified policy framework to control network operations, a function of providing policy rules so that a control plane function(s) (e.g., the AMF 113, the SMF 117, and the like) implements the policy rules, a function of implementing a front end for accessing related subscription information for determining a policy in a user data repository (UDR) 114.

The URLLCF/NEF 119 may be a form of expressing two different NFs collectively as one NF. For example, the URLLCF may perform control for an ultra-reliable communication service and/or a low-latency communication service as an NF for providing an ultra-reliable and low-latency communication service. In addition, the NEF may access information for managing the UE 111 in the 5G network, and may be a network entity capable of transmitting a subscription to a mobility management event of the corresponding UE 111, a subscription to a session management event of the corresponding UE 111, a request for session related information, a charge information configuration of the corresponding UE 111, a request to change the PDU session policy for the corresponding UE 111, and small data for the corresponding UE 111.

The TMF 120 may identify whether the UPFs 115 and 116 support single transmission or redundant transmission, manage information about single transmission and redundant transmission, and, if necessary, may work with URLLC Function (URLLCF).

The DN 130 may be, for example, an operator service, an Internet access, or a 3rd party service, or the like. The DN 130 may transmit a downlink protocol data unit (PDU) to the UPF 115 and 116, or may receive a PDU transmitted from the UE 111 via the UPF 115 and 116.

The AF 140 may interoperate with a 3 GPP core network in order to support functions, for example, application effect on traffic routing, access to NEF, and interoperating with a policy framework for policy control.

Meanwhile, FIG. 1 illustrates two different paths 11 and 12 between the UE 111 and the NG-RAN 112. This may mean that the UE 111 can communicate with the NG-RAN 112 using at least one or both of the two different paths 11 and 12. The two different paths 11 and 12 between the UE 111 and the NG-RAN 112 may be different radio bearers. Also, the two different paths 11 and 12 may be cases in which the UE 111 is connected to different cells and/or base stations, or may be different radio bearers in the same cell and/or base station. In addition, in the following description, the paths 11 and 12 between the UE 111 and the NG-RAN 112 may include redundant transmission paths.

In addition, only one path 21 is illustrated between the NG-RNA 112 and the UPF1 115. However, two different paths 22 and 23 are illustrated between the NG-RNA 112 and the UPF2 116. The two different paths 22 and 23 between the NG-RNA 112 and the UPF2 116 may be bearers having the same characteristics or different characteristics. Here, the paths 22 and 23 between the NG-RNA 112 and the UPF2 116 may include redundant transmission paths.

Referring to FIG. 1, the TMF 120 may collect information on the path 21 between the NG-RNA 112 and the UPF1 115 (121), and information on the different paths 22 and 23 between the NG-RNA 112 and the UPF2 116 (122 and 123). In addition, the TMF 120 may provide the collected information to the SMF 117 (124).

With reference to the structure of FIG. 1 described above, an operation according to the disclosure will be described as an example. In the disclosure, the URLLC service is a method for providing ultra-reliable and/or high-speed services. Therefore, the service provided by the AF 140 according to the disclosure may require transmission of service data provided using a packet error rate (PER), which is one of the requirements for high reliability.

In the case that the AF 140 requests a PER of 10e-6 from a 5GS, as long as redundant transmissions (e.g., paths with reference numerals 11 and 12) are provided in an NG-RAN segment, the 5GS may achieve the PER using single transmission on a backhaul between the NG-RAN 112 and the UPF 115 or 116. The PER of 10e-6 may be a PER that is easily achievable in the 5GS. However, the satisfaction of the PER of 10e-6 may be achieved more easily in the case where the paths 11 and 12 for the redundant transmissions are existed than the NG-RAN segment, that is, the case where only a single transmission path is existed between the NG-RAN 112 and the UE 111.

On the other hand, a PER of 10e-8 may be requested for the service provided by the AF 140. The PER of 10e-8 required by the AF 140 may be a requirement that is difficult to achieve with only the NG-RAN segment, that is, the paths 11 and 12 for redundant transmissions between the NG-RAN 112 and the UE 111. As such, in the case that it is difficult to achieve the PER only with the redundant transmission in the NG-RAN segment, the PER may be achieved only by using redundant transmission (e.g., paths with reference numerals 22 and 23) for a backhaul between the NG-RAN and the UPF.

As described above, it has to determine whether single transmission is sufficient in the NG-RAN segment or whether redundant transmission should be used in the NG-RAN segment, or redundant transmission is required on a backhaul between the NG-RAN and the UPF, in order to satisfy the PER required by the AF 140. In this disclosure, the TMF 120 may be constituted to make this determination. The dotted lines 121, 122, and 123 connected to a single transmission path and redundant transmission paths are illustrated to indicate that the TMF 120 collects such information from each required NF. In addition, a dotted line 124 is exemplified to explain that the interoperation between the TMF 120 and the SMF 117 is performed, and a dotted line 125 is exemplified to explain the interoperation between the TMF 120 and the URLLCF/NEF 119.

In the case that the PER of 10e-8 that requires for redundant transmission on a backhaul between the NG-RAN and the UPF is requested, the TMF 120, which configures the transmission method of the backhaul, may provide information on the UPF 115 supporting a single transmission and the UPF 116 supporting a redundant transmission, that is, whether the single transmission/redundant transmission is supported (or may be configured) for each of the UPFs 115 and 116, to the URLLCF. As such, the meaning that specific information may be provided from the TMF 120 to the URLLCF may be expressed as interoperating with each other.

In the disclosure, it is assumed that the AF 140 is an application server outside the 5GS. Thus, the URLLCF illustrates a form included with or within the NEF. In the case that the AF 140 exists with reliability within the 5GS, it will be apparent to those skilled in the art that the URLLCF may be implemented without the NEF.

In the disclosure to be described below, a case where the URLLCF/NEF 119 is implemented in the form illustrated in FIG. 1 will be described. Among the URLLCF/NEF 119, the NEF serves as a connection between the 5GS and the AF 140, and the URLLCF may perform the URLLC-related functions within the 5GS. Therefore, the URLLCF may be aware of the URLLC information of 5GS. Although the URLLCF is illustrated as an independent NF separate from the TMF 120 in FIG. 1, it may be implemented as one NF by configuring the TMF operation to be performed in the URLLCF according to implementation. In addition, as in the description of each component of FIG. 1 above, the single transmission or redundant transmission support information for each UPF may also be accessed by the SMF 117. That is, the SMF 117 may request and receive single transmission or redundant transmission support information for each UPF to and from the TMF 120 whenever necessary, and/or may receive and store the single transmission or redundant transmission support information for each UPF provided by the TMF 120 at specific cycle.

Based on the above, the URLLCF/NEF 119 may control to configure an appropriate path through which specific service data requested from the AF 140 may be transmitted within a desired latency time.

Figure 2:
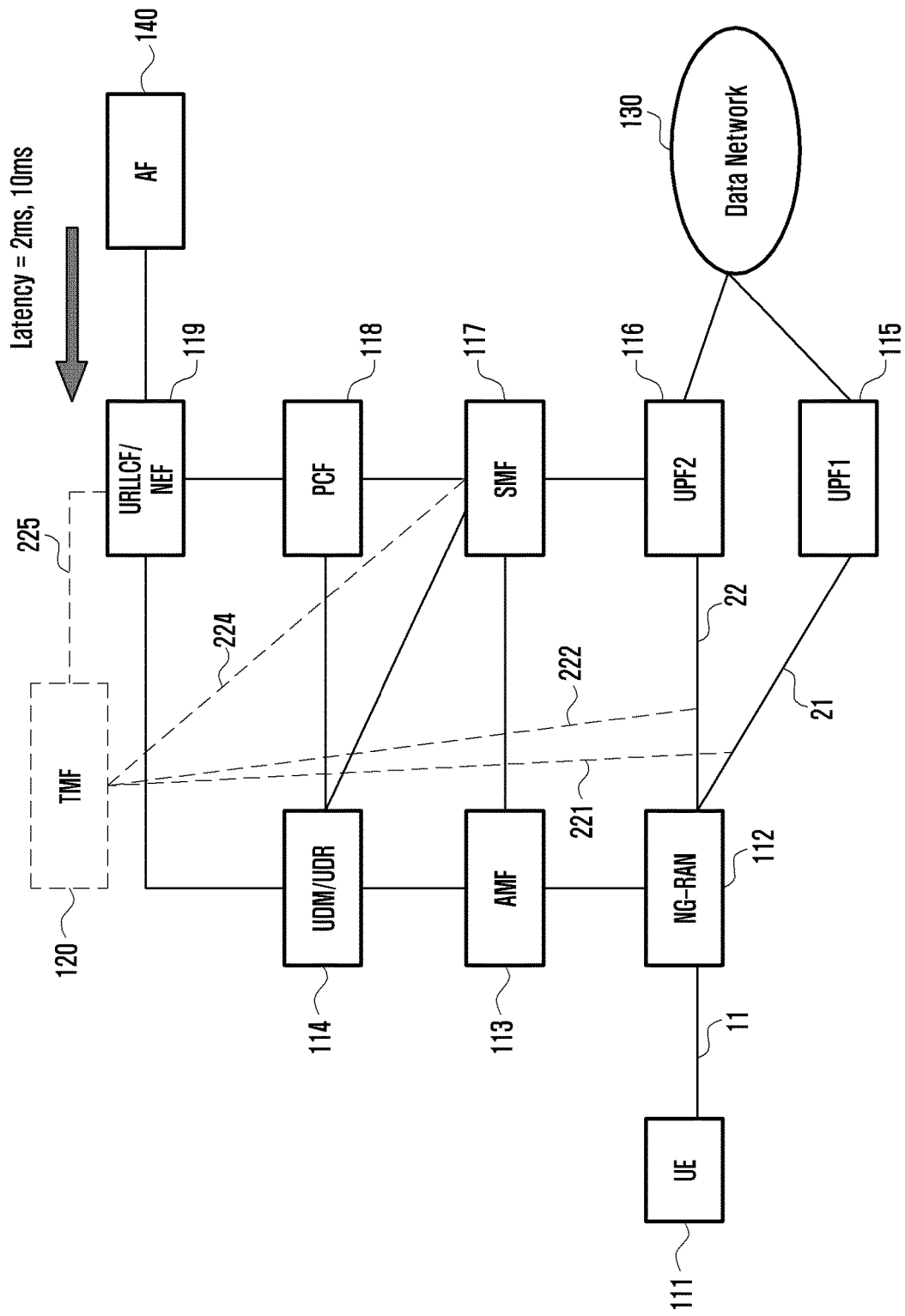
FIG. 2 is a diagram for explaining a case in which a 5GS interoperates with a time sensitive networking (TSN) of a transport network of a backhaul for providing end-to-end (E2E) low-latency according to an embodiment of the disclosure.

FIG. 2 is a diagram for explaining a case where a 5GS interoperates with a time sensitive networking (TSN) of a transport network of a backhaul for providing end-to-end (E2E) low-latency according to an embodiment of the disclosure.

Among the components illustrated in FIG. 2, the same reference numerals are used for components identical to those of FIG. 1. Only the components that have changed compared to FIG. 1 will be described first.

Referring to FIG. 2, unlike in FIG. 1, only one path 11 between the UE 111 and the NG-RAN 112, that is, one path between the UE 111 and the NG-RAN 112, for example, a bearer is illustrated. However, it should be noted that FIG. 2 does not exclude the case where two different paths between the UE 111 and the NG-RAN 112 are used, as described above, and is only for convenience of description. In addition, only one path 21 between the NG-RNA 112 and the UPF1 115 is illustrated and only one path 22 between the NG-RNA 112 and the UPF2 116 is illustrated. It should be noted that this also does not exclude the case of using two different paths, and is only for convenience of description.

In the disclosure, the URLLC service is a method for providing an ultra-reliable and/or high-speed service. Therefore, it may be assumed that a latency of 10 ms or a latency of 2 ms is required as a high-speed condition for the service provided by the AF 140 according to the disclosure.

Considering the case where the AF 140 requests an end-to-end (E2E) latency of 10 ms for the service provided to the UE 111, the 5GS may be considered by being largely divided into two segments.

First, there may be a segment in which a radio interface between the UE 111 and the NG-RAN 112 is used. Since radio transmission is basically required in the segment where the radio interface between the UE 111 and the NG-RAN 112 is used, the minimum time required for transmission must be guaranteed considering resource allocation and radio signal transmission latency. According to the 5GS standard, a latency of 0.5 ms may be required in actual transmission between the UE 111 and the NG-RAN 112. Therefore, the transmission time of the NG-RAN segment should be configured in consideration of this time.

Second, transmission latency time within 5GS may exist. For example, transmission latency time between the NG-RAN 112 and the UPF 115 or 116 may be included. Therefore, this transmission time latency must be taken into account.

Then, the operation of the TMF 120 for considering the above two points will be described.

First, it is assumed that the AF 140 provides data serviced within a transmission latency of 10 ms. At this time, the TMF 120 simply guarantees 5 ms in the path 11 between the NG-RAN 112 and the UE 111 and 5 ms in the backhaul, so that the 5GS can support this latency. In the disclosure, the latency in the path 11 between the NG-RAN 112 and the UE 111 and the latency in the backhaul are configured to be the same, but this is only an example for explanation, and it should be noted that times may be configured differently depending on needs. However, a minimum latency time needed for transmission may be required in transmission between the NG-RAN 112 and the UE 111, and a latency must be configured to be a value greater than the minimum latency time required between the NG-RAN 112 and the UE 111.

Next, if the AF 140 requests an E2E latency of 2 ms for the service provided to the UE 111, 1 ms is guaranteed in the path 11 between the NG-RAN 112 and the UE 111 and 1 ms is guaranteed in the backhaul, so that 5GS can support such latency. Here, for convenience of description, the latency in the path 11 between the NG-RAN 112 and the UE 111 and the latency in the backhaul are configured to be the same for description. In addition, since the TMF 120 requires the E2E delay of 2 ms, even if a latency is configured to 1 ms in the NG-RAN segment, as discussed above, it is longer than the minimum latency time of 0.5 ms required in the NG-RAN segment. Thus, no special restrictions are required.

To this end, the TMF 120 that configures the transmission method of the backhaul may configure the transport network so that the UPF supports a latency of 5 ms, or may configure the transport network so that the UPF supports a latency of 1 ms.

It may be assumed that each of the UPFs 115 and 116 in FIG. 2 provides different latencies. For example, it may be assumed that only a latency of 5 ms can be provided between the NG-RAN 112 and the UPF1 115 and a latency of 1 ms as well as a latency of 5 ms may be provided between the NG-RAN 112 and the UPF2 116. Considering this a little further, in the case where there is a plurality of UFPs, one UFP may have a backhaul configured with a transport network to support a latency of 5 ms, and another UPF may have a backhaul configured with a transport network to support a latency of 1 ms. Accordingly, the TMF 120 may obtain in advance information about how much latency may be supported for each backhaul. Reference numeral 221 and reference numeral 222 illustrate that the TMF 120 obtains in advance information about how much latency it may support for each backhaul. In addition, the TMF 120 may provide the collected information to the SMF 117 (224).

Also, the TMF 120 may interoperate with the SMF 117 and the URLLCF/NEF 119. As described above, the fact that the TMF 120 may interoperate with the SMF 117 and the URLLCF/NEF 119 means that the TMF 120 may provide or receive specific information to/from the URLLCF.

With reference again to the operation according to FIG. 2, the AF 140 may provide a latency requirement requested by the AF 140 to the URLLCF through the NEF of the URLLCF/NEF 119. The URLLCF may then provide the latency requirement to the TMF 120. Accordingly, the TMF 120 may obtain latency information on the path 21 between the NG-RAN 112 and UPF1 115 and the path 22 between the NG-RAN 112 and UPF2 116 in advance or at an appropriate time, and may provide this information to the URLLCF and the SMF 117.

Meanwhile, as described in FIG. 1 above, the URLLCF may be constituted to perform the function of the TMF. That is, the TMF 120 may be implemented as a specific function within the URLLCF, or as illustrated in FIG. 2, each may be implemented as a separate NF.

Based on the above, the URLLCF/NEF 119 may control to configure an appropriate path through which specific service data requested by the AF 140 can be transmitted within a desired latency time.

Figure 3:
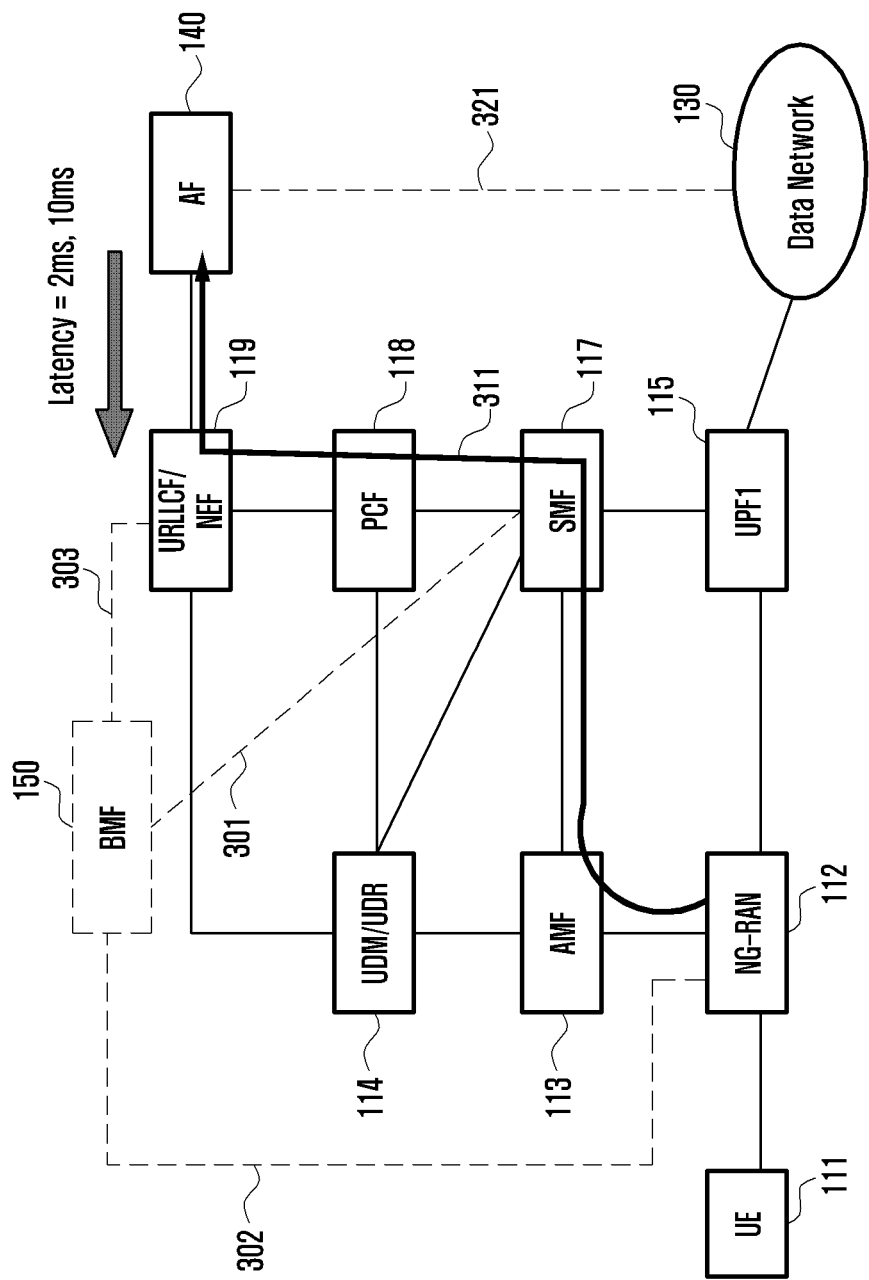
FIG. 3 is a diagram for explaining a downlink stream scheduling method of an application considering RAN buffering to provide an end-to-end (E2E) low-latency service according to an embodiment of the disclosure.

FIG. 3 is a diagram for explaining a downlink stream scheduling method of an application considering RAN buffering to provide an end-to-end (E2E) low-latency service according to an embodiment of the disclosure.

First, a buffer management function (BMF) device 150, which is a new NF not described in FIGS. 1 and 2 described above, is illustrated in FIG. 3. Then, first, the BMF 150 will be reviewed.

Referring to FIG. 3, the BMF 150 may manage the buffer status of the NG-RAN 112. For example, the BMF 150 may perform a function of controlling a buffered time in the NG-RAN 112 when transmitting service data provided from the AF 140 to the UE 111. Reference numeral 302, which is a dotted line connecting the BMF 150 and the NG-RAN 112 illustrated in FIG. 3, illustrates a path through which control information for buffered time management is transmitted. In fact, such control information may be transmitted directly from the BMF 150 as illustrated in FIG. 3 or may be provided through specific other NFs.

Further, in contrast to FIGS. 1 and 2, FIG. 3 illustrates only one UPF1 115. However, in the case that a plurality of UPFs is required in applying the disclosure, a plurality of UPFs may be included. That is, it should be noted that the disclosure is not limited to only one UPF. In addition, in contrast to FIG. 1, only one path is illustrated even in the NG-RAN segment, and only one path is illustrated between the NG-RAN 112 and the UPF1 115. However, in the disclosure, as in FIG. 1 described above, the case where the NG-RAN segment supports redundant transmission is not excluded. In addition, in the disclosure, a case in which redundant transmission is supported between the NG-RAN 112 and the UPF1 115 is not excluded. It should be noted that FIG. 3 is illustrated for convenience of explanation of the disclosure.

With reference to FIG. 3, it may be assumed that a latency of 10 ms or less is required as a latency requirement in providing an E2E service by the AF 140. As such, in the case that 10 ms is required for the E2E service, it may be assumed that a latency of 5 ms must be guaranteed in the NG-RAN 112. At this time, an actual transmission time from the NG-RAN 112 to the UE 111 may be 0.5 ms. In this case, the buffering of the NG-RAN 112 must be guaranteed to be 4.5 ms or less.

As another example, it may be assumed that a latency of 2 ms or less is required as a latency requirement in providing the E2E service by the AF 140. In this way, in the case that a latency of 1 ms must be guaranteed in the NG-RAN 112 for the E2E service, the actual transmission time from the NG-RAN 112 to the UE 111 is 0.5 ms, so the buffering of the NG-RAN 111 must be guaranteed to be 0.5 ms or less.

To this end, the BMF 150, which manages the buffering of the NG-RAN 112, may configure a notification buffering level to 2.25 ms to support the buffering of the NG-RAN 112 within 4.5 ms in the case that 10 ms is required for the E2E service. Here, the difference between the notification buffering level and the time configured for buffering in the NG-RAN 112 is because the notification needs time to be effective and reflected in scheduling.

As another example, in the case that a latency of 2 ms or less is required as a latency requirement in providing the E2E service, the BMF 150 may configure the notification buffering level to 0.25 ms so that the buffering of 0.5 ms is supported in the NG-RAN 112.

In the case that there is a plurality of NG-RANs to which one UE 111 may access or is connected, one NG-RAN may support the notification buffering level of 2.25 ms but may not support the notification buffering level of 0.25 ms. In addition, there may be a case in which another NG-RAN may support not only the notification buffering level of 2.25 ms but also the notification buffering level of 0.25 ms. Here, in the case that there is a plurality of NG-RANs to which one UE 111 is connected, it may be any state in which two or more base stations may be accessed, such as in a dual connectivity (DC) mode.

The BMF 150 may obtain and store information on the notification buffering level that may be provided in each NG-RAN in advance, or may obtain this information at a time when necessary. The BMF 150 may interoperate with the SMF 117 illustrated by reference numeral 301 and the URLLCF/NEF 119 illustrated by reference numeral 303. Also, as described above, the NEF serves as a connection between the 5GS and the AF 140, and the URLLCF may perform the URLLC-related functions within a 5GS, and may obtain URLLC information of the 5GS. Meanwhile, the BMF 150 according to FIG. 3 may be implemented as one specific function in the URLLCF. In this case, the BMF 150 may be implemented in a form included in the URLLCF. In the disclosure, it will be described assuming that the BMF 150 is implemented as a separate NF. For reference, as described in FIG. 1, the SMF 117 may also access single transmission or redundant transmission support information for each UPF.

Based on this information, the URLLCF/NEF 119 may control transmission of data serviced within the latency time required by the AF 140 based on the information obtained from the BMF 150.

In addition, in the case that the notification buffering level is reached, the NG-RAN 112 may notify the BMF 150 that the notification buffering level has been reached, and this information (information notifying that the notification buffering level has been reached) may be transferred to the AF 140 by the BMF 150. However, as illustrated by reference numeral 311, the NG-RAN 112 may notify the SMF 117 of this information via the AMF 113, and the SMF 117 may notify the AF 140 of this information via the PCF 118 and URLLCF/NEF 119. In any case, the AF 140 receiving the information that the notification buffering level has been reached may control an amount of traffics transferred to a user plane within the DN 130 as illustrated by reference numeral 321.

Figure 4:
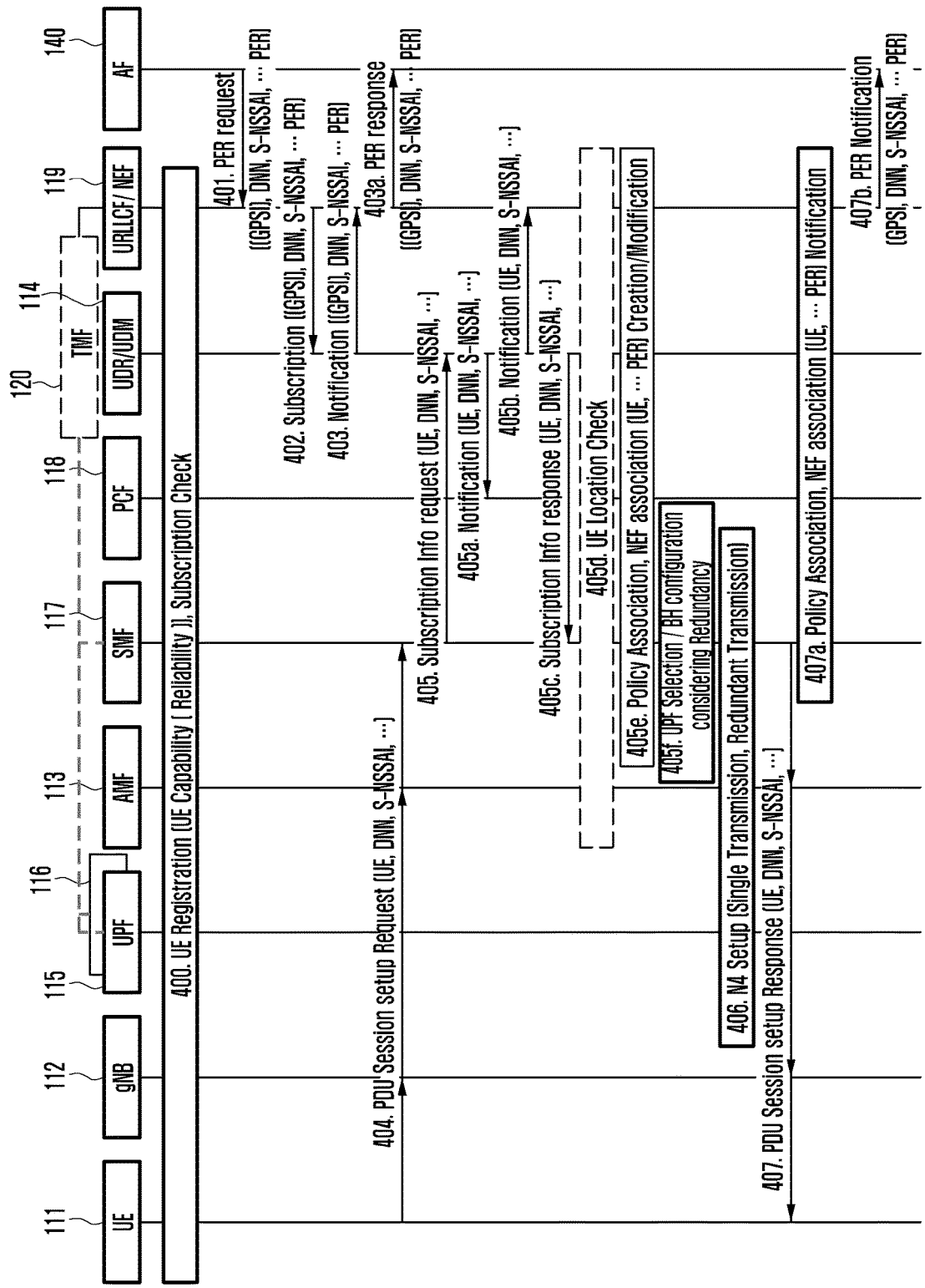
FIG. 4 is a diagram illustrating a signal flow in a case where a backhaul to which a PER is reflected is selected during PDU session setup according to an embodiment of the disclosure.

FIG. 4 is a diagram illustrating a signal flow in a case where a backhaul to which PER is reflected is selected during PDU session setup according to an embodiment of the disclosure.

The components in FIG. 4 will be described using the same network structure as described in FIGS. 1 to 3 described above. In addition, a gNode B (gNB) in FIG. 4 is an example of a base station of a 5G network, and may be understood the same as the NG-RAN 112 in FIGS. 1 to 3 above. Therefore, in the following description, a gNB uses the same reference numerals as the NG-RAN, and even if used interchangeably, it should be understood the same.

Referring to FIG. 4, in operation 400, the UE 111 may transmit a reliability requirement to a 5G core (5GC) through a process of registering the UE 111 to the 5GS. Since the UE registration procedure in operation 400 is defined in a 5G standard protocol, specific details will be omitted here. Also, in the disclosure, the 5GC may be understood as the same as the 5GS. In the following description, even if the 5GC and the 5GS are used interchangeably, both should be understood the same. The 5GC may identify subscription information such as whether the corresponding UE 111 can receive a reliability service. In the case that the subscription for the corresponding UE 111 is identified, the 5GC may additionally store the identified content in an NF such as the UDR/UDM 114.

In operation 401, the AF 140 may request a PER for a service to be provided to a specific UE 111 through the 5GS. This request may be transmitted using a PER request message. Requesting a PER by the AF 140 may be a case of providing a reliability service to the corresponding UE 111. The AF 140 may designate the transmission condition of data (or traffic) transmitted for a reliability service. In addition, the AF 140 may provide information such as an ID of the UE such as a generic public subscription identifier (GPSI) of the UE 111 or a Group ID to which the UE 111 belongs in order to specify the UE 111 to receive a reliability service. Such a UE ID and/or a group ID to which the UE belongs may provide URLLCF/NEF 119 with information obtained when the UE 111 registers with the AF 140. In this case, the GPSI is not illustrated in FIG. 4, but may be information received in the case that the UE 111 performs a registration procedure with the AF 140. In addition, the AF 140 may provide the URLLCF/NEF 119 with information necessary to configure a protocol data unit (PDU) session such as a data network name (DNN) to be accessed and single-network slice selection assistance information (S-NS-SAI). Also, the AF 140 may provide a coverage condition to the URLLCF/NEF 119. The coverage condition may be provided as geographical information. For example, the coverage condition may be limited to the center coordinate of a specific point and a range that includes radius information based on the center coordinate. Such PER and coverage condition information may be configured in advance in the 5GC operator network through an administrator's separate input. In this case, operation 401 of receiving a condition request from the AF 140 may be omitted.

In the case that the geographic location information is obtained from the AF 140 in operation 401, the NEF may change the geographic location information into coordinates and a radius. As another example, in the case that the geographic location information is obtained from the AF 140, the location information may be expressed based on a Cell ID or the like. In addition, the URLLCF/NEF 119 may change the UE ID provided as the GPSI from the AF 140 to an ID used only within the 5GS, such as a subscription permanent identifier (SUPI).

In the case that operation 401 in which the AF 140 requests a condition is performed before operation 400 in which the UE 111 is registered, a UE ID such as the GPSI of the UE 111, which is targeted in operation 401, or a Group ID to which the UE 111 belongs may provide information when the UE 111 registers with the AF 140. As another example or additionally, the UE 111 may provide the AF 140 with information when configuring a PDU session such as DNN/S-NSSAI. The information when configuring the PDU session provided by the UE 111 to the AF 140 may be stored in the UDR of the UDR/UDM 114. When the UE 111 sends a registration request via the AMF 113 during operation 400, the AMF 113 may transfer the ID information of the UE 111 to the UDR while identifying the subscription information stored in the UDM of the UDR/UDM 114. In this way, when the UDR of the UDR/UDM 114 is aware that the UE 111 satisfying the corresponding condition is registered, the process from operation 402 can be performed by notifying the URLLCF of the URLLCF/NEF 119.

In operation 402, the NEF of the URLLCF/NEF 119 subscribes the URLLC service condition received in operation 401 in the UDR/UDM 114, and may subscribe to be notified when a PDU session satisfying the conditions occurs later. At this time, the URLLCF of URLLCF/NEF 119 may configure the UPF and a transport network to support a PER request in conjunction with the TMF 120. For example, in the case that the AF 140 requests the PER of 10e-6, which is one of the examples described in FIG. 1, the 5GS may achieve the PER by using a single transmission on the backhaul between the NG-RAN 112 and the UPF.

As another example described in FIG. 1, in the case that the AF 140 requests a PER of 10e-8, the TMF 120 of the 5GS may identify (verify) whether there is the UPF supporting redundant transmission on a backhaul between the NG-RAN 112 and the UPF. The result identified by the TMF 120 may be provided to the URLLCF of the URLLCF/NEF 119. Therefore, if there is no UPF supporting redundant transmission on the backhaul between the current NG-RAN 112 and the UPF, the URLLCF may control the configuration directly or through the TMF 120 to support redundant transmission on at least one of available UPFs. The case where the URLLCF of the URLLCF/NEF 119 configures a transport network through the TMF 120 will be described in operation 405*f* to be described below.

In operation 403, the UDR/UDM 114 may notify the URLLCF/NEF 119 of the subscribed content of the AF 140 for each condition. The notification in operation 403 may use a notification message.

In operation 403*a*, the URLLCF/NEF 119 may notify the AF 140 that the 5GS have successfully received the PER request. Operation 403*a* may be a PER response message as a response message to the request of operation 401 above.

In operation 404, the UE 111 may send a PDU session setup request message to the AMF 113, and the AMF 113 may transfer the PDU session setup request message to the SMF 117. At this time, the PDU session setup request message may include information such as UE ID and DNN/S-NSSAI.

In operation 405, the SMF 117 may request identification of subscriber information from the UDM of the UDR/UDM 114. The identification request of the subscriber information may use a subscription information request message. Accordingly, the UDR/UDM 114 may additionally identify whether a related service is subscribed in the UDR/UDM 114. This identification may be a procedure by which the UDM identifies (or verifies) whether the corresponding information is subscribed in the UDR.

In operation 405*a*, if at least one or more than two service conditions among the UE ID, Group ID, DNN, and S-NS-SAI subscribed in operation 402 described above are satisfied, the UDR/UDM 114 may notify the PCF 118 of a corresponding content. In some cases, the UDR/UDM 114 may be constituted to notify the PCF 118 of the contents in the case that all service conditions are satisfied. Such notification may use a notification message.

In operation 405*b*, if at least one or more than two service conditions among the UE ID, Group ID, DNN, and S-NS-SAI subscribed in operation 402 are satisfied. the UDR/UDM 114 may notify the URLLCF/NEF 119 of a corresponding content. Such notification may use a notification message.

In operation 405*c*, the SMF 117 may receive the subscriber information identification result from the UDM/UDR 114. The subscriber information identification result in operation 405*c* may be a subscription information response message as a response to the subscription information request message in operation 405. Based on this, the SMF 117 may identify (verify) whether a reliability service may be supported with this PDU session.

In operation 405*d*, the URLLCF/NEF 119 may identify the location (UE location) information of the UE 111 with the AMF 113, and reidentify whether it matches the location information configured in operation 401 described above.

In operation 405*e*, the SMF 117 may configure an association with the PCF 118 receiving the notification message from the UDR/UDM 114 in operation 405*a*. Also, in operation 405*e*, the PCF 118 may configure an association with the URLLCF/NEF 119 receiving the notification message from the UDR/UDM 114 in operation 405*b*. Based on this association, the URLLCF/NEF 119 may transfer the UE 111 information and PER information to the PCF 118. In addition, the PCF 118 receiving the UE 111 information and the PER information from the URLLCF/NEF 119 may transfer the received UE 111 information and PER information to the SMF 117.

In operation 405f, the SMF 117 may select a UPF satisfying the PER condition. This information may be the UPF configured by the TMF 120 in operation 402. The SMF 117 may receive UPF information that satisfies the PER condition in conjunction with the TMF 120. Alternatively, in operation 402, the SMF 117 may be already configured to be aware of this information. In this case, the TMF 120 may provide the UPF information satisfying the PER condition to the SMF 117 in operation 402. At this time, the UPF and transport network configuration may be performed so that the SMF 117 supports redundant transmission in conjunction with the TMF.

In operation 406, the SMF 117 may configure an N4 session for the UPF selected in operation 405f. Through this N4 session, the SMF 117 may perform control necessary for a corresponding UPF.

In operation 407, the SMF 117 may transfer a PDU session setup response message to the UE 111 via the AMF 113. At this time, a necessary QoS configuration process may be performed simultaneously. Here, the QoS configuration may also include configuration of the NG-RAN 112 segment.

In operation 407a, the SMF 117 may notify the URLLCF/NEF 119 via the PCF 118 that the PDU session has been configured with a corresponding PER for the corresponding UE 111.

In operation 407b, the URLLCF/NEF 119 may notify the AF 140 that the PDU Session has been configured with the corresponding PER for the UE 111. The message that is notified from the URLLCF/NEF 119 to the AF of the configuration of the PDU session with PER may be a PER notification message. Although the above has been described using a specific message, it will be apparent to those skilled in the art that the operation according to the disclosure can be performed even if a message with a different name is used in the case that the different name includes information according to each message and requirement information according to the disclosure.

Figure 5:
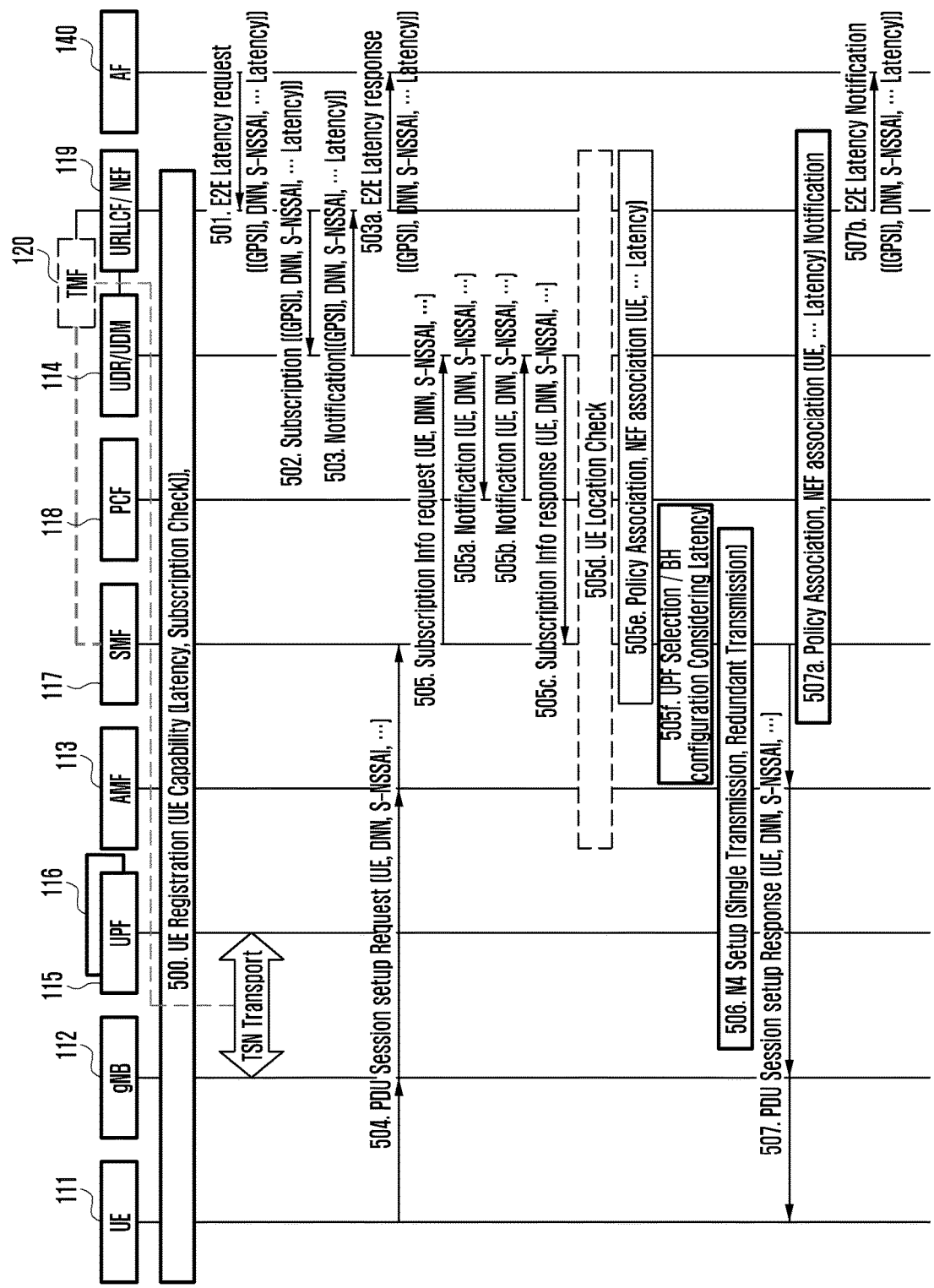
FIG. 5 is a diagram illustrating a signal flow in a case where a backhaul to which a latency request is reflected is selected during PDU session setup according to an embodiment of the disclosure.

FIG. 5 is a diagram illustrating a signal flow in a case where a backhaul to which a latency request is reflected is selected during PDU session setup according to an embodiment of the disclosure.

The components in FIG. 5 will also be described using the same network structure as described in FIGS. 1 to 3 described above. In addition, in FIG. 5, a gNB is an example of a base station of a 5G network, and may be understood as the same as the NG-RAN 112 in FIGS. 1 to 3 above. Therefore, in the following description, a gNB uses the same reference numerals as the NG-RAN, and even if used interchangeably, it should be understood the same.

Referring to FIG. 5, in operation 500, the UE 111 transfers a latency requirement to a 5GC through the process of registering the UE 111 to the 5GS, and the 5GC identifies subscription information such as whether the UE 111 may receive a latency service. In the case that the subscription is identified, the 5GC may additionally store the corresponding content in the UDM of the UDR/UDM 114.

In operation 501, the AF 140 may request latency guarantee for a service to be provided to a specific UE 111 from the 5GS. Such a request message may use an E2E latency request message. In addition, by using the request message in operation 501, the specific UE 111 may be requested to provide a latency service. Here, the latency service may mean a case in which transmission must be performed within a specific latency time. Also, as in FIG. 4, the 5GC may be understood as the same as the 5GS. In the following description, even if the 5GC and the 5GS are used interchangeably, both should be understood the same.

Meanwhile, as described above, since the URLLC service requires ultra-reliable and/or low-latency, data (or traffic) to be transmitted must be transmitted within a specific latency time. Accordingly, the AF 140 may designate a condition required for data transmission to the UE 111. In addition, the AF 140 may provide information such as a UE ID such as the GPSI of the UE 111 or a Group ID to which the UE 111 belongs to the URLLCF/NEF 119 in order to specify a UE capable of receiving low-latency data. Although the UE ID and/or the group ID to which the UE belongs is not illustrated in FIG. 5, the UE ID and/or the group ID may be information obtained when the UE 111 registers with the AF 140. Further, the AF 140 may provide the URLLCF/NEF 119 with necessary information when configuring a PDU session, such as a DNN/S-NSSAI to which the UE 111 is going to access. Also, the AF 140 may provide a coverage condition to the URLLCF/NEF 119. The coverage condition may be provided as geographic information. For example, the coverage condition may be limited to the center coordinate of a specific point and a range that includes a radius based on the coordinate. The information on such latency guarantee and coverage condition may be configured in advance in the 5GC operator network through an administrator's separate input. In this case, operation 501 in which the AF 140 make a request may be omitted.

In the case that the geographic location information is obtained from the AF 140 in operation 501, the URLLCF/NEF 119 may change the geographic location information into coordinates and a radius. As another example, in the case that the geographic location information is obtained from the AF 140, the location information may be expressed based on a Cell ID or the like. In addition, the URLLCF/NEF 119 may change the UE ID provided as GPSI from the AF 140 to an ID used only inside the 5GS, such as SUPI.

In the case that operation 501 in which the AF 140 requests a condition is performed before operation 500 in which the UE 111 is registered, the UE ID such as the GPSI of the UE 111 or the group ID to which the UE belongs may provide information when the UE 111 registers with the AF 140. As another example or additionally, the UE 111 may provide the AF 140 with information when configuring a PDU session such as DNN/S-NSSAI. The information when configuring a PDU session provided by the UE 111 to the AF 140 may be stored in the UDR of the UDR/UDM 114. In the process of performing operation 500, when the UE 111 sends a registration request via the AMF 113, the AMF 113 may transfer the ID information of the UE 111 to the UDR while identifying the subscription information with the UDM of the UDR/UDM 114. In this way, if the UDR of the UDR/UDM 114 is aware that the UE 111 satisfying the corresponding condition has been registered, it notifies the URLLCF of the URLLCF/NEF 119 so that the process from operation 502 may be performed.

Also, the TSN transport network illustrated in FIG. 5 may be composed of nodes and links. The traffic processing latency time at each node, for example, the gBN 112 and the UPF 115 or 116, and the traffic transfer latency time of each link may be managed by a central network configuration server (CNC) (not illustrated in the drawing). In addition, for this purpose, each node may be synchronized in time through a time synchronization method to guarantee accurate traffic transfer. The TMF 120 may accurately determine the latency time of the TSN transport network segment or accurately configure the latency time required for this segment in conjunction with the CNC.

In operation 502, the NEF of the URLLCF/NEF 119 subscribe the URLLC service condition received in operation 501 in the UDR/UDM 114, and may subscribe to be notified when a PDU session satisfying the condition occurs later.

At this time, the URLLCF of the URLLCF/NEF 119 may configure the UPF and the transport network to support a latency request in conjunction with the TMF 120. For example, if the AF 140 requests an E2E latency of 10 ms, the 5GS may support the latency by guaranteeing 5 ms in the NG-RAN 112 and 5 ms in a backhaul. In the disclosure, for convenience of description, it is assumed that the transmission latency in the RAN segment and the transmission latency in the 5GC are the same as 5 ms, but the transmission latency value may be configured differently if necessary.

As in another example in FIG. 2 described above, if the AF 140 requests the E2E latency of 2 ms, the 5GS may support this by guaranteeing 1 ms in the NG-RAN 112 and 1 ms in the backhaul. Here, the transmission latency in the RAN segment and the transmission latency in the 5GC have been described assuming that they are the same as 1 ms, but the transmission latency value may be configured differently if necessary.

In order to satisfy such a latency, the TMF 120 configures the transport network so that the backhaul between the UPF and the NG-RAN 112 supports a latency of 5 ms, or the backhaul between the UPF and the NG-RAN 112 supports a latency of 1 ms.

Meanwhile, as described in FIG. 2, in the case that there is a plurality of UPFs, one UFP may have a backhaul configured with the transport network to support a latency of 5 ms, and another UPF may have a backhaul configured with the transport network to support a latency of 1 ms. In FIG. 2 above, the description is made assuming that 5 ms is supported between the NG-RAN 112 and the UPF1 115, and 1 ms is supported between the NG-RAN 112 and the UPF2 116. If the same assumption is made here, the URLLCF of the URLLCF/NEF 119 may select a path between the NG-RAN 112 and the UPF2 116 supporting a latency of 1 ms based on information provided from the TMF 120. Also, the TMF 120 may interoperate with the SMF 117 and the URLLCF/NEF 119. The case where the URLLCF of the URLLCF/NEF 119 configures the transport network through the TMF 120 will be described in operation 505f to be described below.

In operation 503, the UDR/UDM 114 may notify the URLLCF/NEF 119 of the subscribed contents of the AF 140 for each condition. The notification in operation 503 may use a notification message.

In operation 503a, the URLLCF/NEF 119 may notify the AF 140 that the 5GS has successfully received the latency request. Operation 503a may be an E2E latency response message as a response message to the request of operation 501 above.

In operation 504, the UE 111 may send a PDU session setup request message to the AMF 113, and the AMF 113 may transfer the PDU session setup request message to the SMF 117. At this time, the PDU session setup request may include information such as UE ID and DNN/S-NSSAI.

In operation 505, the SMF 117 may request subscriber information identification from the UDM of the UDR/UDM 114. The subscriber information identification request may use a subscription information request message. The UDM of the UDR/UDM 114 may additionally identify whether a related service is subscribed in the UDR of the UDR/UDM 114.

In operation 505a, if at least one or more than two service conditions among the UE ID, Group ID, DNN, and S-NSSAI subscribed in operation 502 are satisfied, the UDR of the UDR/UDM 114 may notify the PCF 118 of the corresponding content.

In operation 505b, if at least one or more service conditions among the UE ID, Group ID, DNN, and S-NSSAI subscribed in operation 502 are satisfied, the UDR of the UDR/UDM 114 may notify the URLLCF/NEF 119 of the corresponding content. Such notification may use a notification message.

In operation 505c, the SMF 117 may receive a subscriber information identification result from the UDM of the UDR/UDM 114. The subscriber information identification result in operation 505c may be a subscription information response message as a response to the subscription information request message in operation 505. The SMF 117 may identify (verify) whether a latency service may be supported with this PDU Session.

In operation 505d, the URLLCF/NEF 119 may identify the location (UE location) information of the UE 111 with the AMF 113, and reidentify whether it matches the location information configured in operation 501 described above.

In operation 505e, the SMF 117 may configure an association with the PCF 118 receiving the notification message from the UDR/UDM 114 in operation 505a. Also, in operation 505e, the PCF 118 may configure an association with the URLLCF/NEF 119 notified in operation 505b. Based on this association, the URLLCF/NEF 119 may transfer the latency information about the UE 111 to the PCF 118. In addition, the PCF 118 may transfer the latency information about the UE 111 to the SMF 117.

In operation 505f, the SMF 117 may select a UPF that satisfies a latency condition. This information may be the UPF configured with the TMF 120 in operation 502. The SMF 117 may receive the UPF information satisfying the latency condition in conjunction with the TMF 120. Alternatively, in operation 502, the SMF 117 may be configured to be aware of this information in advance. In this case, the TMF 120 may provide the UPF information satisfying the latency condition to the SMF 117 in operation 502. At this time, the UPF and transport network configuration may be performed so that the SMF 117 interoperates with the TMF 120 to support latency guarantee.

In operation 506, the SMF 117 may configure an N4 session for the UPF selected in operation 505f. Through this N4 session, the SMF 117 may perform control necessary for the corresponding UPF.

In operation 507, the SMF 117 may transfer a PDU session setup response message to the UE 111 via the AMF 113. At this time, a necessary QoS configuration process may be performed simultaneously. Here, the QoS configuration may also include the configuration of the NG-RAN 112.

In operation 507a, the SMF 117 may notify the URLLCF/NEF 119 via the PCF 118 that a PDU session has been configured with the corresponding latency for the corresponding UE 111.

In operation 507b, the URLLCF/NEF 119 may notify the AF 140 that the PDU session has been configured with the corresponding E2E latency for the corresponding UE. A message notified by the URLLCF/NEF 119 to the AF 140 that the PDU session has been configured with PER may be a PER notification message.

The above description has been made using a specific message. However, the disclosure is not limited to the above specific message name. For example, even if the message name is different, it will be apparent to those skilled in the art that the disclosure can be applied in the case that information for providing a latency service and a control process for this according to the purpose of the disclosure are included.

Figure 6:
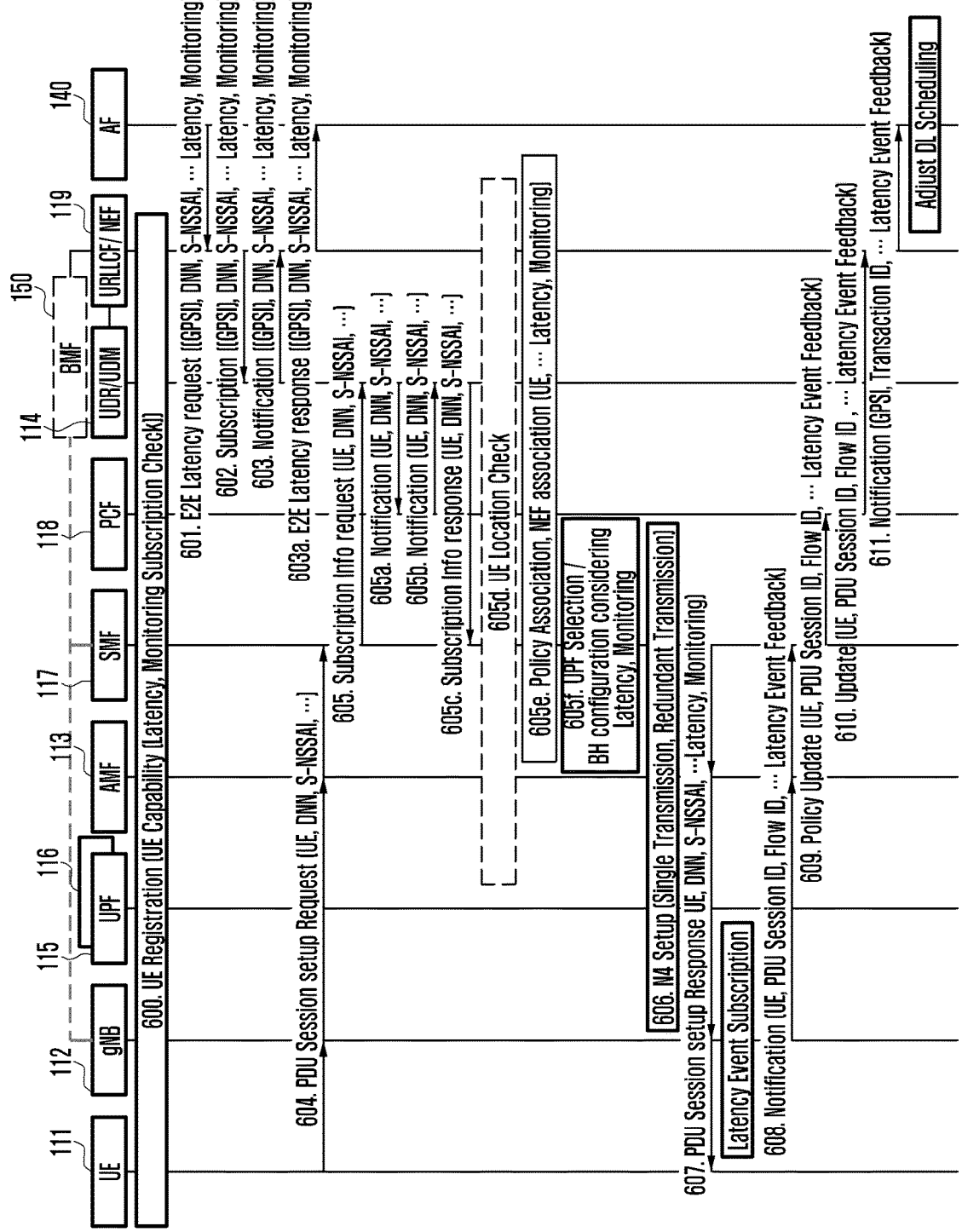
FIG. 6 is a diagram illustrating a signal flow between NFs in a case where a QoS monitoring result is fed back to an AF and used for downlink scheduling in order to satisfy a latency requirement according to an embodiment of the disclosure.

FIG. 6 is a diagram illustrating a signal flow between NFs in a case where a QoS monitoring result is fed back to an AF and used for downlink scheduling in order to satisfy a latency requirement according to an embodiment of the disclosure.

FIG. 6 will also be described using the same network structure as described in FIGS. 1 to 3 described above. In addition, in FIG. 6, a gNB is an example of a base station of a 5G network, and may be understood the same as the NG-RAN 112 in FIGS. 1 to 3 above. Therefore, in the following description, a gNB uses the same reference numerals as the NG-RAN, and even if used interchangeably, it should be understood the same.

Referring to FIG. 6, in operation 600, the UE 111 transfers a latency requirement to a 5GC through the process of registering the UE 111 with the 5GS, and the 5GC identifies subscription information such as whether the UE 111 may receive latency and monitoring services. In the case that the subscription is identified, the 5GC may additionally store the corresponding content in the UDM, etc. of the UDR/UDM 114. Also, as in the description of the previous drawings, the 5GC may be understood as the same as the 5GS. In the following description, even if the 5GC and the 5GS are used interchangeably, both should be understood the same.

In operation 601, the AF 140 may request latency guarantee from the 5GS for the service to be provided to the specific UE 111. Such a request message may use an E2E latency request message. In addition, using the request message in operation 501, the UE 111 may be requested to provide a latency service. This request also includes a monitoring request. Here, the latency service may mean a case in which transmission must be performed within a specific latency time.

Meanwhile, as described above, since the URLLC service requires an ultra-reliable and/or low-latency service, transmitted data (or traffic) must be transmitted within a specific latency time. Accordingly, the AF 140 may designate conditions required for data transmission to the UE 111. In addition, the AF 140 may provide the URLLCF/NEF 119 with a UE ID such as the GPSI of the UE 111 or a Group ID to which the UE 111 belongs to specify a UE capable of receiving low-latency data. Although the UE ID and/or the group ID to which the UE belongs is not illustrated in FIG. 5, it may be information obtained when the UE 111 registers with the AF 140. Also, the AF 140 may provide the URLLCF/NEF 119 with necessary information when configuring a PDU session, such as DNN/S-NSSAI that the UE 111 is going to access. Also, the AF 140 may provide a coverage condition to the URLLCF/NEF 119. The coverage conditions may be provided as geographic information. For example, the coverage condition may be limited to the center coordinate of a specific place and a range that includes a radius based on the coordinate. The information on such E2E latency and monitoring and coverage condition may be configured in the 5GC operator network in advance by an administrator's separate input. In this case, operation 601 in which the AF 140 requests a condition may be omitted.

In the case that the geographic location information is obtained from the AF 140 in operation 601, the URLLCF/NEF 119 may change the geographic location information into coordinates and a radius. Alternatively, the location information may be expressed based on Cell ID and the like.

In addition, the URLLCF/NEF 119 may change the UE ID provided as the GPSI from the AF 140 to an ID used only inside the 5GS, such as SUPI.

If operation 601, in which the AF 140 requests a condition, is performed before operation 600, which is the operation in which the UE 111 is registered, the UE ID such as the GPSI of the UE 111, which is targeted in operation 601, or the group ID to which the UE 111 belongs, may provide information when the UE 111 registers with the AF 140. As another example or additionally, the UE 111 may provide the AF 140 with information when configuring a PDU session such as DNN/S-NSSAI. The information when configuring a PDU session provided by the UE 111 to the AF 140 may be stored in the UDR of the UDR/UDM 114. In the process of performing operation 600, when the UE 111 sends a registration request via the AMF 113, the AMF 113 may transfer the ID information of the UE 111 to the UDR as well while identifying the subscription information in the UDM of the UDR/UDM 114. In this way, if the UDR of the UDR/UDM 114 is aware that the UE 111 satisfying the corresponding condition is registered, the UDR notifies the URLLCF of the URLLCF/NEF 119, so that the operations from operation 602 are performed.

In operation 602, the URLLCF/NEF 119 subscribes the URLLC service condition received in operation 601 in the UDR of the UDR/UDM 114, and subscribes to be notified when a PDU session satisfying the condition occurs later.

At this time, the URLLCF of the URLLCF/NEF 119 may configure the UPF and a transport network to support a latency request in conjunction with the TMF 120 (not illustrated in FIG. 6). For example, if the AF 140 requests an E2E latency of 10 ms, the 5GS may support the request by guaranteeing 5 ms in the NG-RAN 112 and 5 ms in the backhaul. In the disclosure, for convenience of description, the description is made assuming that the transmission latency in the RAN segment and the transmission latency in the 5GC are the same as 5 ms, but the transmission latency value may be configured differently if necessary.

As another example, if the AF 140 requests an E2E latency of 2 ms, the 5GS may support this request by guaranteeing 1 ms in the NG-RAN 112 and 1 ms in the backhaul. Here, the transmission latency in the RAN segment and the transmission latency in the 5GC have been described assuming that they are the same as 1 ms, but the transmission latency value may be configured differently if necessary.

In order to satisfy such a latency, the TMF 120 may configure the transport network so that the backhaul between the UPF and RAN supports a latency of 5 ms, or the backhaul between the UPF and the RAN supports a latency of 1 ms.

On the other hand, as described above in FIG. 2, in the case that there is a plurality of UPFs, one UFP may have a backhaul configured with the transport network to support a latency of 5 ms, and another UPF may have a backhaul configured with the transport network to support a latency of 1 ms. The TMF 120 may interoperate with the SMF 117 and the URLLCF/NEF 119. The case where the URLLCF of the URLLCF/NEF 119 configures the transport Network through the TMF 120 will be described in operation 605f to be described below.

At this time, the URLLCF of the URLLCF/NEF 119 may configure the NG-RAN 112 to support a latency request and monitoring in conjunction with the BMF 150. For example, in order to support E2E of 10 ms, the NG-RAN 112 must guarantee a latency of 5 ms, and since the actual transmission time is 0.5 ms, the buffering of the NG-RAN 112 must be guaranteed to 4.5 ms or less. In addition, in order to support E2E of 2 ms, a latency of 1 ms must be guaranteed in the NG-RAN 112. Since the actual transmission time is 0.5 ms, the buffering of the NG-RAN 112 may need to be guaranteed to be 0.5 ms or less. To this end, the BMF 150 that manages the buffering of the NG-RAN 112 may configure the notification buffering level to 2.25 ms so that a buffering latency of 4.5 ms is supported at the gNB 112. In addition, the notification buffering level may be configured to 0.25 ms so that a buffering latency of 0.5 ms or less is guaranteed at the gNB 112.

Even in the case where there is a plurality of gNBs, one gNB may support the notification buffering level of 2.25 ms but may not support the notification buffering level of 0.25 ms. In addition, another gNBs may support not only the notification buffering level of 2.25 ms but also the notification buffering level of 0.25 ms. Accordingly, the BMF 150 may select an NG-RAN capable of supporting the notification buffering level based on the required latency. The BMF 150 may interoperate with the gNB and the URLLCF of the URLLCF/NEF 119. The NEF of the URLLCF/NEF 119 serves as a connection between the 5GS and the AF 140, and the URLLCF of the URLLCF/NEF 119 may serve to perform the URLLC-related functions inside the 5GS, and may be aware of the URLLC information of the 5GS.

Meanwhile, as described in FIG. 3, the URLLCF of the URLLCF/NEF 119 may be implemented as one NF identical to the BMF 150. The buffering decision criterion information managed by the BMF 150 may also be accessed by the gNB 112. In addition, the BMF 150 may also operate with the SMF 117. This buffering decision criterion may be configured in operation 605*f*. Therefore, the buffering decision criterion will be further explained in operation 605*f*.

In operation 603, the UDR of the UDR/UDM 114 may notify the URLLCF/NEF 119 of the subscribed contents for each condition. The notification in operation 603 may use a notification message.

In operation 603*a*, the URLLCF/NEF 119 may notify the AF 140 that the 5GS has successfully received a latency request and a monitoring request. Operation 603*a* may be an E2E latency response message as a response message to the request of operation 601 above.

In operation 604, the UE 111 may send a PDU session setup request message to the AMF 113, and the AMF 113 may transfer the PDU session setup request message to the SMF 117. At this time, the PDU session setup request may include information such as UE ID and DNN/S-NSSAI.

In operation 605, the SMF 117 may request the identification of subscriber information from the UDM of the UDR/UDM 114. The UDM of the UDR/UDM 114 may additionally identify whether a related service is subscribed in the UDR of the UDR/UDM 114.

In operation 605*a*, if at least one or more than two service conditions among the UE ID, Group ID, DNN, and S-NSSAI subscribed in operation 602 are satisfied, the UDR of the UDR/UDM 114 may notify the PCF 118 of the corresponding content.

In operation 605*b*, if at least one or more than two service conditions among the UE ID, Group ID, DNN, and S-NSSAI subscribed in operation 602 are satisfied, the UDR of the UDR/UDM 114 may notify the URLLCF/NEF 119 of the corresponding content. Such notification may use a notification message.

In operation 605*c*, the SMF 117 may receive a subscriber information identification result from the UDM of the UDR/UDM 114. The subscriber information identification result in operation 605*c* is a response to the subscription information request message in operation 605, and may be a subscription information response message. The SMF 117 may identify (verify) whether a latency service and a monitoring service may be supported with this PDU session.

In operation 605*d*, the URLLCF/NEF 119 may identify (or verify) the location information of the UE 111 from the AMF 113, and may reidentify whether the location information matches the location information configured in operation 601.

In operation 605*e*, the SMF 117 configures an association with the PCF 118 configured in operation 605*a*, and the PCF 118 may configure an association with the URLLCF/NEF 119 notified in operation 605*b*. Based on this association, the URLLCF/NEF 119 may transfer the latency about the UE 111 and monitoring information to the PCF 118. In addition, the PCF 118 may transfer the latency about the UE 111 and the monitoring information to the SMF 117.

In operation 605*f*, the SMF 117 may select a UPF satisfying the latency condition. This information may be the UPF configured by the TMF 120 in operation 602. The SMF 117 may receive the UPF information satisfying the latency condition in conjunction with the TMF 120. Alternatively, in operation 602, the SMF 117 may be configured to be aware of this information. In this case, the TMF 120 may provide the UPF information satisfying the latency condition to the SMF 117 in operation 602. At this time, the UPF and transport network configuration may be performed so that the SMF 117 interoperates with the TMF 120 to support latency guarantee.

At this time, the gNB 112 supporting the monitoring function and the UPF capable of configuring the backhaul may be selected, and a backhaul between the selected UPF and the gNB supporting the monitoring function may be configured. In operation 602, the information configured in conjunction with the BMF 150 may be used. At this time, the buffering monitoring level may be configured through the BMF 150 in the same way as described in operation 602.

In operation 606, the SMF 117 may configure an N4 session for the UPF selected in operation 605*f*. Through this N4 session, the SMF 117 may perform control necessary for the corresponding UPF.

In operation 607, the SMF 117 may transfer a PDU session setup response message to the UE 111 via the AMF 113. At this time, a necessary QoS configuration process may be performed simultaneously. Here, the QoS configuration may also include configuration of the NG-RAN 112. At this time, when a latency monitoring event occurs in the NG-RAN 112, event subscription for notification may be performed.

In operation 608, the gNB 112 may transfer latency event feedback information generated in the gNB 112 to the SMF 117. If the latency event feedback information corresponds to the buffering decision criterion determined in operation 602, it may be notified that the content of the latency event feedback information satisfies the determined criterion or the latency event feedback level information may be included in the message and transmitted. To this end, the gNB 112 may interoperate with the BMF 150. In operation 608, the latency event feedback information may be transmitted using a notification message.

In operation 609, the SMF 117 may transfer the latency event feedback information to the PCF 118. The latency event feedback information may be transmitted using a policy update message.

In operation 610, the PCF 118 may transfer the corresponding latency event feedback to the corresponding UE 111 to the URLLCF/NEF 119 using a policy update function for the corresponding PDU Session.

In operation 611, the URLLCF/NEF 119 may notify the AF 140 of the corresponding latency event feedback to the UE 111. In operation 611, the latency event feedback information may be transmitted using a notification message.

Based on the process described above, the AF 140 may control downlink streaming scheduling according to the latency event feedback content. For example, in the case that a transport network is configured to support a latency of 1 ms for a backhaul between the UPF and the NG-RAN, and a notification buffering level is configured to 0.25 ms so that the buffering of 0.5 ms is supported in the NG-RAN, if the buffering level exceeding 0.25 ms is notified, the AF 140 may immediately reduce an amount of traffics transmitted per cycle by half to control the downlink stream scheduling.

Figure 7:
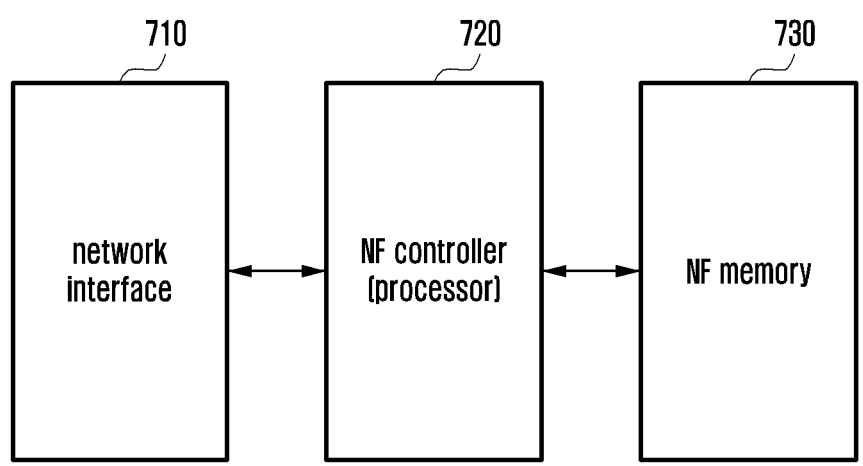
FIG. 7 is a functional block diagram of an NF to which the disclosure is applied according to an embodiment of the disclosure.

FIG. 7 illustrates a functional block diagram of an NF to which the disclosure is applied according to an embodiment of the disclosure.

Referring to FIG. 7, a network interface 710, an NF controller 720, and an NF memory 730 may be included.

The network interface 710 may provide an interface for communication with another NF. For example, it may provide an interface for communicating with each NF as described in FIGS. 1 to 6 where the NF is the TMF 120. In addition, in the case in which the NF is the URLLCF/NEF 119, an interface for communicating with the TMF 120, the BMF 150, the AF 140, and the like may be included. In other NFs, it may provide an interface according to each need. In addition, the network interface 710 may provide an interface for transmitting or receiving various types of control messages/signals/data.

The NF controller 720 may control operations of a corresponding NF. For example, the NF' controller 720 may perform control of operations described with reference to FIGS. 1 to 6 in correspondence with each NF, such as a case in which the NF is the TMF 120 or the URLLCF/NEF 119, or the SW 117.

The NF controller 720 may be implemented with at least one or more than two processors, and as described above, in the case that the NF controller 720 is implemented in a server on a predetermined network, it may be driven on the processor of the server.

The NF memory 730 may store information for controlling an NF, information produced while control is performed, and information required according to the disclosure. For example, the NF memory 730 may store information which has been described with reference to FIGS. 1 to 6. In addition, in the case in which the NF memory 730 is a memory corresponding to the UDM/UDR 114, it may store information corresponding to the UE 111. In addition, the NF memory 730 may store conditions required in the URLLC service according to the disclosure.

The NF memory 730 may be implemented as a volatile memory, a non-volatile memory, or the like, and may be implemented in various forms such as a hard disk, RAM, ROM, and the like. In the disclosure, a method of implementing the NF memory 730 is not particularly limited.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for providing an ultra-reliable and low-latency communication (URLLC) service in an ultra-reliable and low-latency communication function (URLLCF) of a mobile communication system, the method comprising:
  receiving an end-to-end latency request message from an application function (AF) device, the end-to-end latency request message including a latency requirement and at least one of generic public subscription identifier (GPSI) information of a specific user equipment (UE), data network name (DNN), or single-network slice selection assistance (S-NSSAI);
  performing a subscription procedure of URLLC service condition with a unified data management (UDM)/user data repository (UDR) device;
  obtaining location information of the UE;
  identifying whether the location information conforms to a range required by the URLLC service;
  configuring a policy and association satisfying a latency for the URLLC service to the UE; and
  providing a URLLC service notification to the AF based on the configuration.

2. The method of claim 1, wherein the performing of the subscription procedure of the URLLC service condition with the UDM/UDR device comprises:
  transmitting, to the UDM/UDR device, a subscription request message including the latency requirement and the at least one of the GPSI information of the specific UE, the DNN, or the S-NSSAI.

3. The method of claim 2, wherein the performing of the subscription procedure of the URLLC service condition with the UDM/UDR device further comprises:
  receiving, from the UDM/UDR device, a notification message in response to the subscription request message.

4. The method of claim 3, wherein the performing of the subscription procedure of the URLLC service condition with the UDM/UDR device further comprises:
  transmitting, to the AF device, an end-to-end latency response message in response to the end-to-end latency request message.

5. The method of claim 1, wherein the configuring of the policy and association satisfying the latency for the URLLC service to the UE comprises:
  transmitting, to a session management function (SMF) device via a policy control function (PCF) device, the latency requirement; and
  receiving, from the SMF device via the PCF device, a notification message indicating that a PDU Session has been configured based on the latency requirement for the UE.

6. A method for providing an ultra-reliable and low-latency communication (URLLC) service in an ultra-reliable and low-latency communication function (URLLCF) of a mobile communication system, the method comprising:
  receiving a packet error rate (PER) request message from an application function (AF) device, the PER request message including PER information and at least one of generic public subscription identifier (GPSI) information of a specific user equipment (UE), data network name (DNN), or single-network slice selection assistance (S-NSSAI);
  performing a subscription procedure of URLLC service condition with a unified data management (UDM)/user data repository (UDR) device;
  obtaining location information of the UE;

identifying whether the location information conforms to a range required by the URLLC service;

configuring a policy and association satisfying a latency for the URLLC service to the UE; and providing a URLLC service notification to the AF based on the configuration.

7. The method of claim 6, wherein the performing of the subscription procedure of the URLLC service condition with the UDM/UDR device comprises:

transmitting, to the UDM/UDR device, a subscription request message including the PER information and the at least one of the GPSI information of the specific UE, the DNN, or the S-NSSAI.

8. The method of claim 7, wherein the performing of the subscription procedure of the URLLC service condition with the UDM/UDR device further comprises:

receiving, from the UDM/UDR device, a notification message in response to the subscription request message.

9. The method of claim 8, wherein the performing of the subscription procedure of the URLLC service condition with the UDM/UDR device further comprises:

transmitting, to the AF device, a PER response message in response to the PER request message.

10. The method of claim 6, wherein the configuring the of the policy and association satisfying the latency for the URLLC service to the UE comprises:

transmitting, to a session management function (SMF) device via a policy control function (PCF) device, the PER information; and receiving, from the SMF device via the PCF device, a notification message indicating that a PDU Session has been configured based on the PER information for the UE.

11. A method for providing an ultra-reliable and low-latency communication (URLLC) service in an ultra-reliable and low-latency communication function (URLLCF) of a mobile communication system, the method comprising:

receiving an end-to-end latency request message from an application function (AF) device, the end-to-end latency request message including latency requirement, quality of service (QoS) monitoring information, and at least one of generic public subscription identifier (GPSI) information of a specific user equipment (UE), data network name (DNN), or single-network slice selection assistance (S-NSSAI);

performing a subscription procedure of URLLC service condition with a unified data management (UDM)/user data repository (UDR) device;

obtaining location information of the UE;

identifying whether the location information conforms to a range required by the URLLC service;

configuring a policy and association satisfying a latency for the URLLC service to the UE; and providing a URLLC service notification for adjusting a downlink scheduling to the AF based on the configuration.

12. The method of claim 11, wherein the performing of the subscription procedure of the URLLC service condition with the UDM/UDR device comprises:

transmitting, to the UDM/UDR device, a subscription request message including the latency requirement, the QoS information, and the at least one of the GPSI information of the specific UE, the DNN, or the S-NSSAI.

13. The method of claim 12, wherein the performing of the subscription procedure of the URLLC service condition with the UDM/UDR device further comprises:

receiving, from the UDM/UDR device, a notification message in response to the subscription request message.

14. The method of claim 13, wherein the performing of the subscription procedure of the URLLC service condition with the UDM/UDR device further comprises:

transmitting, to the AF device, an end-to-end latency response message in response to the end-to-end latency request message.

15. The method of claim 11, wherein the configuring of the policy and association satisfying the latency for the URLLC service to the UE comprises:

transmitting, to a gNode B (gNB) via a session management function (SMF) device, the latency requirement and the QoS information; and receiving, from the gNB via the SMF device, an update message indicating a latency event feedback.

* * * * *